(12) United States Patent
Raber et al.

(10) Patent No.: US 12,374,974 B2
(45) Date of Patent: Jul. 29, 2025

(54) ELECTRIC AXIAL FLOW MACHINE AND DISPLACEMENT DEVICE FOR AN ELECTRIC AXIAL FLOW MACHINE

(71) Applicant: Schaeffler Technologies AG & Co. KG, Herzogenaurach (DE)

(72) Inventors: Christoph Raber, Ottweiler-Steinbach (DE); Holger Witt, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 282 days.

(21) Appl. No.: 18/007,881

(22) PCT Filed: May 3, 2021

(86) PCT No.: PCT/DE2021/100395
§ 371 (c)(1),
(2) Date: Dec. 2, 2022

(87) PCT Pub. No.: WO2021/244697
PCT Pub. Date: Dec. 9, 2021

(65) Prior Publication Data
US 2023/0231455 A1    Jul. 20, 2023

(30) Foreign Application Priority Data
Jun. 4, 2020    (DE) .................. 102020114857.7

(51) Int. Cl.
*H02K 21/02* (2006.01)
*H02K 7/12* (2006.01)
*H02K 21/14* (2006.01)

(52) U.S. Cl.
CPC .................. *H02K 21/026* (2013.01)

(58) Field of Classification Search
CPC ........ H02K 21/026; H02K 7/12; H02K 21/14; H02K 21/24
USPC ... 310/152, 156.32, 156.46, 191, 261, 261.1
See application file for complete search history.

(56) References Cited

U.S. PATENT DOCUMENTS

| 3,233,133 A | 2/1966 | Kober |
| 6,348,751 B1 | 2/2002 | Jermakian et al. |
| 7,342,342 B2 | 3/2008 | Naiton et al. |
| 8,109,847 B2 | 2/2012 | Reuschel |
| 2008/0265702 A1 | 10/2008 | Yeh |

FOREIGN PATENT DOCUMENTS

| DE | 102008059300 | 6/2009 | |
| EP | 1653595 A1 * | 5/2006 | ........... H02K 21/026 |
| EP | 2985893 | 2/2016 | |
| JP | 2005318718 A * | 11/2005 | |

(Continued)

*Primary Examiner* — Jose A Gonzalez Quinones
(74) *Attorney, Agent, or Firm* — Volpe Koenig

(57) ABSTRACT

An electric axial flow machine having a stator, a first rotor body arranged on a rotor shaft, a second rotor body arranged on the rotor shaft, and a displacement device arranged between the two rotor bodies and coupled thereto. The displacement device includes at least one spring device which acts on the first rotor body and the second rotor body against the magnetic attractive force between the rotor body and the stator. The spring device is configured such that a spring force characteristic is formed which runs above the magnetic force characteristic over the entire displacement path.

14 Claims, 7 Drawing Sheets

(56) References Cited

FOREIGN PATENT DOCUMENTS

Figure 1:
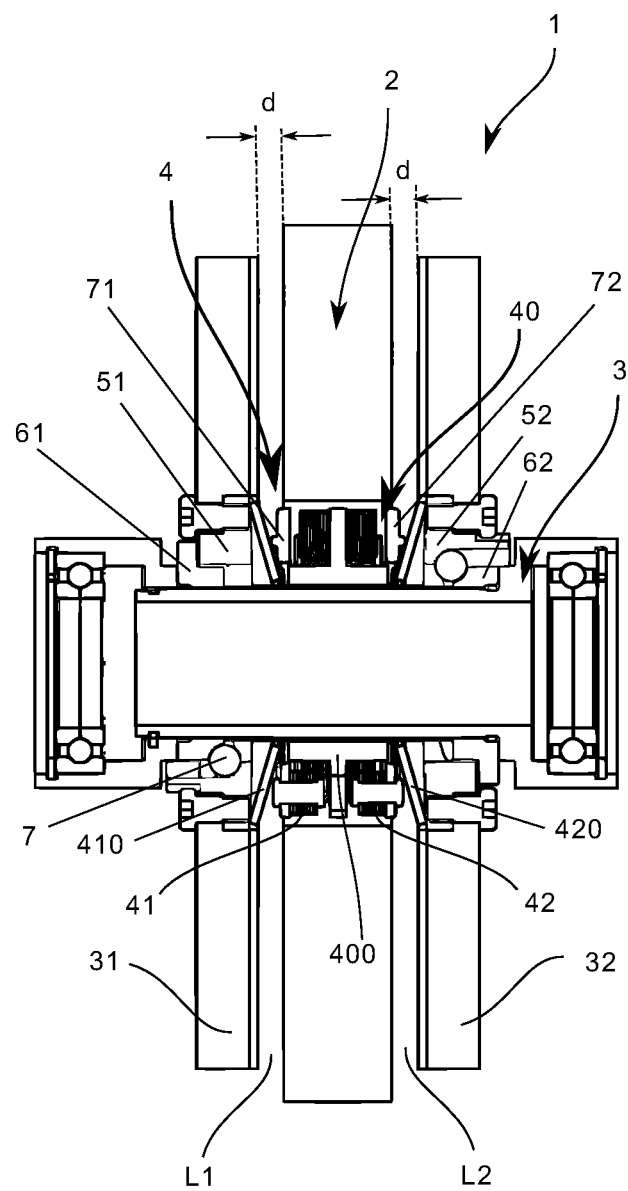

| | | | | |
|---|---|---|---|---|
| JP | 2007244023 A | * | 9/2007 | |
| JP | 2007244027 | | 9/2007 | |
| JP | 5135693 | | 12/2012 | |

* cited by examiner

ELECTRIC AXIAL FLOW MACHINE AND DISPLACEMENT DEVICE FOR AN ELECTRIC AXIAL FLOW MACHINE

CROSS-REFERENCE TO RELATED APPLICATIONS

This application is the U.S. National Phase of PCT Appln. No. PCT/DE2021/100395, filed May 3, 2021, which claims the benefit of German Patent Appln. No. 10 2020 114 857.7, filed Jun. 4, 2020, the entire disclosures of which are incorporated by reference herein.

TECHNICAL FIELD

The present disclosure relates to an electric axial flow machine, comprising a stator, a first rotor body which is arranged on a rotor shaft, and a second rotor body which is arranged on the rotor shaft, and a displacement device which is arranged between the two rotor bodies and is coupled to same, wherein one of the two rotor bodies is arranged on the one axial side of the stator at an axial distance, forming a first air gap, and wherein the other of the two rotor bodies is arranged on the other axial side at an axial distance, forming a second air gap, and wherein the axial distance between the rotor bodies, arranged axially on both sides, and the stator can be varied over a displacement path by means of the displacement device depending on a torque occurring between the rotor shaft and the rotor bodies. Furthermore, the disclosure relates to a displacement device for an electric axial flow machine.

BACKGROUND

Axial flow machines are already well known from the prior art.

An electric axial flow machine with a stator and a rotor is known from EP 2 985 893 A1, wherein the stator comprises at least two stator segments, and wherein the rotor is connected to a rotor shaft, wherein the rotor and/or the rotor shaft are rotatably mounted in a bearing, and wherein the stator segments are arranged immovably relative to the bearing in the direction of rotation of the rotor. At least one of the stator segments is arranged to be movable in the axial or radial direction relative to the bearing to adjust the width of the air gap between the rotor and the stator segments.

SUMMARY

It is the object of the present disclosure to provide an axial flow machine which is improved with regard to torque-dependent field amplification, and a displacement device for an axial flow machine which improves the torque-dependent amplification of the magnetic field.

This object is achieved by an electric axial flow machine with one or more of the features disclosed herein and by a displacement device with one or more of the features disclosed herein.

An axial flow machine according to the disclosure comprises a stator, a first rotor body which is arranged on a rotor shaft and a second rotor body which is arranged on the rotor shaft, and a displacement device which is arranged between the two rotor bodies and is coupled to same. One of the two rotor bodies is arranged on one axial side of the stator at an axial distance, forming a first air gap, and the other of the two rotor bodies is arranged on the other axial side at an axial distance, forming a second air gap. By means of the displacement device, the axial distance between the rotor bodies, arranged axially on both sides, and the stator can be varied over a displacement path depending on a torque occurring between the rotor shaft and the rotor bodies, wherein the magnetic attractive force between the respective rotor body and the stator over the displacement path maps a magnetic force characteristic. According to the disclosure, the displacement device comprises at least one spring device which acts on the first rotor body and the second rotor body against the magnetic attractive force between the rotor body and the stator, wherein the spring device is configured such that a spring force characteristic is formed which runs above the magnetic force characteristic over the entire displacement path. The axial flow machine is preferably designed as a permanently excited synchronous machine for the drive in an electrified motor vehicle. The advantage achieved by the design according to the disclosure is that an axial flow machine is provided in which a torque-dependent field strengthening is realized with structurally simple means. Another advantage of the design is that the large magnetic forces, which must be supported by the outer bearings in such a motor variant, are greatly reduced by the internal support of the forces. This means that storage to the outside can be designed less expensively (warehouses can be smaller).

First, the individual elements are explained in the order in which they are mentioned in the set of claims, and then particularly preferred embodiments of the subject matter according to the disclosure are described.

The magnetic flow in an electric axial flow machine (AFM), such as an electric prime mover of a motor vehicle designed as an axial flow machine, is directed axially to a direction of rotation of the rotor of the axial flow machine in the air gap between the stator and the rotor. There are different types of axial flow machines. A known type is a so-called I arrangement, in which the rotor is arranged axially next to a stator or between two stators. Another known type is a so-called H arrangement, in which two rotors are arranged on opposite axial sides of a stator.

The stator of an electric axial flow machine has a stator body with a plurality of stator windings arranged in the circumferential direction. The stator body can be formed in one piece or to be segmented, seen in the circumferential direction. The stator body can be formed from a stator laminated core with multiple laminated electrical sheets. Alternatively, the stator body can also be formed from a compressed soft magnetic material, such as so-called SMC (soft magnetic composite) material.

A rotor shaft is a rotatably mounted shaft of an electric machine to which the rotor or rotor body is coupled in a non-rotatable manner.

The rotor of an electric axial flow machine can be designed at least in parts as a laminated rotor. A laminated rotor is designed to be layered in the axial direction. The axial magnetic flux has to overcome the adhesive or insulation layers between the stacked individual electrical sheets, which causes the magnetic circuit to experience shear (additional air gap) and lose efficiency. Alternatively, the rotor of an axial flow machine can also have a rotor carrier which is correspondingly equipped with magnetic sheets and/or SMC material and with magnetic elements designed as permanent magnets.

Advantageous embodiments are specified below and in the claims. The features listed individually can be combined with one another in a technologically meaningful manner and can define further embodiments according to the disclosure. In addition, the features are specified and explained in more detail in the description, in which further preferred embodiments are shown.

According to an advantageous embodiment, it can be provided that the spring device comprises a first spring element and a second spring element, wherein the first spring element is designed as a leaf spring assembly and the second spring element is designed as a plate spring. It can thus be achieved in an advantageous manner that a space-saving construction is implemented.

According to a further preferred further development according to the disclosure, it can also be provided that the first spring element and the second spring element are mechanically arranged in series and to act in parallel in such a way that over a first displacement path section both the first and the second spring element are at least partially but not completely compressed, and in that the first spring element remains fully compressed within a second displacement path section subsequent to the first displacement path section. The advantage of this configuration is that one of the spring force characteristics can be generated which counteracts the magnetic attractive force acting between the rotor and stator, so that a sufficient force counteracting the magnetic attractive force is ensured over the entire displacement path.

Furthermore, according to a likewise advantageous embodiment, it can be provided that the displacement device comprises the following:
- a spring device with a centrally arranged spring support, viewed in the axial extent of the displacement device, which supports at least one first spring element on each axial side,
- axially on both sides in each case a second spring element acting parallel to the first spring element,
- axially on both sides in each case a first displacement element designed as a support for the first and the second rotor body, wherein the first displacement element is arranged in an axially displaceable and limitedly rotatable manner on the rotor shaft, which is not arranged in an axially displaceable manner, and
- axially on both sides in each case a second displacement element which is connected to the rotor shaft in a rotationally fixed and non-displaceable manner and cooperates with the respective first displacement element.

Each first displacement element is supported in the axial direction against the first and the second spring element and at least one rolling element is arranged between the first displacement element and the second displacement element. The first displacement element has a first ramp element on its side facing the second displacement element, and the second displacement element has a second ramp element on its side facing the first displacement element. The first ramp element and the second ramp element are designed in such a way that if the first displacement element rotates relative to the second displacement element or vice versa, the rotor body is axially displaced relative to the rotor shaft. The advantageous effect of this configuration is due in particular to the space-saving construction.

According to a further particularly preferred embodiment, it can be provided that the first spring element is designed to map a linear spring force characteristic and/or the second spring element is designed to map a progressive spring force characteristic, as a result of which a characteristic that approximates the magnetic force characteristic in the form of a characteristic curve can be produced using simple design means, by means of which too large a distance to the magnetic force characteristic is avoided over the entire displacement path. Being correspondingly close to the magnetic force characteristic would lead to a more complex and stable construction of the displacement device.

Furthermore, the disclosure can also be further developed such that the displacement device is arranged in a floating manner on the rotor shaft and the two rotor bodies support one another via the displacement device. As a result, support via additional bearings is avoided and a further simplified construction is made possible.

In a likewise preferred embodiment, it can also be provided that the spring device is designed to map a spring force characteristic which lies below a function: $F\_Magnet\_Limit = F\_Magnet + F\_Magnet\_max * 0.3$ over the entire displacement path. The value of $F\_Magnet\_max * 0.3$ is particularly preferably in a range of up to a maximum of 4000 N. The value is particularly preferably in a range of 2500 N-3500 N, in particular around 3000 N. The distance to the magnetic force characteristic is not too great and the construction does not become correspondingly complex.

It can also be advantageous to further develop this arrangement in such a way that stop means are provided between the first displacement element and the second displacement element, which are designed in such a way that, in an operating state with a torque present between the rotor shaft and the rotor body which is above a predetermined maximum displacement torque, the torque which occurs is transmitted via the stop means instead of via the corresponding first and second ramp means of first and second displacement elements. The advantage that can be realized in this way is that increased wear on the displacement elements can be prevented and the maximum torque can be reliably transmitted to the rotor shaft.

According to a further preferred embodiment, it can be provided that the first rotor body and the second rotor body are rotationally coupled to one another in such a way that there is no relative rotation between the first rotor body and the second rotor body during operation of the axial flow machine. In particular, a frictional connection between the two rotor bodies is realized via the displacement device arranged between the first and second rotor bodies. In this way it can be achieved that the axial flow machine always works under optimal operating conditions. Furthermore, a structurally simple and cost-effective solution for coupling the rotor bodies on both sides has been found. Alternatively, the rotational coupling can also take place via a form-fitting connection—for example, realized by coupling pins extending in the axial direction between the two rotor bodies.

Finally, the disclosure can also be implemented in an advantageous manner in that a spring bearing ring is provided in each case between the first spring element and the second spring element. This is preferably designed in such a way that torque can be transmitted between the first displacement element of the first rotor and the first displacement element of the second rotor solely by means of a frictional connection. In particular, the spring bearing ring enables optimal use of the plate spring characteristic with regard to the required force (force-displacement characteristic) in the case of a small installation space.

Leaf spring assemblies are used on both sides for the long but almost constant increase at the beginning of the displacement of the spring device. These leaf spring assemblies are self-limiting beyond a certain distance, as they are compressed into a block. They can be protected from overloading by self-limiting. So that the leaf springs can be connected to the same support component from both sides, they must have the same geometry (distance between holes, thickness, installation height, hole circle, etc.). However, the condition is that they must be oriented in opposite directions. This means that when the springs change their axial height during operation, the radial path created thereby must be equal in magnitude and in the same direction. If this is not the case, the leaf springs will build up an internal torque which inhibits the displacement and puts a lot of stress on the components. In addition, the use of the leaf springs offers free centering of the spring device itself.

Advantageously, the spring support of the spring device is designed as a sleeve, which in its axial center has a radially outwardly projecting central annular collar, wherein the annular collar supports a plurality of individual leaf spring assemblies distributed circumferentially on both sides and acting in the axial direction and composed of a plurality of individual leaf springs. Each of the individual leaf spring assemblies is fixedly attached to the annular collar with a free end and each of the individual leaf spring assemblies is fixedly attached with its other free end to the spring bearing ring spaced axially from the annular collar via the individual leaf spring assemblies. Advantageously, the spring device is designed such that the two spring bearing rings, which are arranged axially spaced from the annular collar and are fixedly connected on both sides to the respective individual leaf spring assemblies, move in the same direction of rotation over the entire displacement path and without a relative rotational offset to one another. This creates a spring assembly which, due to its scissors-type structure, prevents relative torsion and thus radial tension between the two axially spaced spring bearing rings when the spring assembly is compressed and the spring assembly is then relaxed over the entire displacement path.

The first ramp element and the second ramp element are preferably designed in such a way that in a state in which the first displacement element and the second displacement element are not rotated relative to one another, the rotor body and the stator are arranged at a predetermined maximum axial distance from one another. The maximum distance (d) between a rotor body and the stator in the rest position (position of maximum field weakening) is dimensioned in such a way that it is made up of the axial thickness of the permanent magnets arranged on the rotor body plus twice the distance of the air gap distance present at maximum field strengthening (minimum air gap).

In a preferred development, the first displacement element has at least three first ramp elements and the second displacement element has at least three second ramp elements which are arranged and configured to correspond to the first ramp elements, so that with three support points arranged distributed around the circumference, an optimized distribution of the axially acting forces of the displacement device is guaranteed.

The object of the disclosure is also achieved by a displacement device for an axial flow machine, which comprises the following:
a centrally arranged spring support, viewed in the axial extent of the displacement device, which supports at least one first spring element on each axial side,
axially on both sides in each case a second spring element acting parallel to the first spring element,
axially on both sides in each case a first displacement element designed as a support for a first and a second rotor body, wherein the first displacement element can be arranged in an axially displaceable and limitedly rotatable manner on the rotor shaft, which is not arranged in an axially displaceable manner, and
axially on both sides in each case a second displacement element which can be connected to the rotor shaft in a rotationally fixed and non-displaceable manner and cooperates with the respective first displacement element.

Each first displacement element is supported in the axial direction against the first and the second spring element, and at least one rolling element is arranged between the first displacement element and the second displacement element. Furthermore, the first displacement element has a first ramp element on its side facing the second displacement element, and the second displacement element has a second ramp element on its side facing the first displacement element. The first ramp element and the second ramp element are designed in such a way that if the first displacement element rotates relative to the second displacement element or vice versa, the rotor body is axially displaced relative to the rotor shaft.

As a result, a compensation spring must be realized by the spring device, which is as close as possible to the magnetic force present between the rotor and the stator. The magnetic force changes as a function of the air gap, so that the spring force must also change over the course of the displacement.

In order to keep the force acting on the displacement device as small as possible, the difference in force between the two characteristics must be kept as small as possible. It must be ensured that the spring force is always greater than the magnetic force over the entire displacement path for setting the air gap, so that a preload remains on the displacement device.

The displacement itself is effected by the torque present in the axial flow machine, which generates an additional axial force via the ramp elements of the displacement elements, which leads to the axial displacement of the rotor body. In the specific embodiment described below, a constant ramp gradient and thus two end positions of the displacement are implemented. However, it would also be conceivable to implement a plurality of intermediate layers if the ramp gradient were designed to be variable over the angle of rotation.

In the initial and intermediate positions, the torque is supported by the ramp system, since otherwise no displacement could take place. In the end position, which is used for high torques in the electric machine, however, it is advantageous to provide an additional connection in the form of stop means between the ramp elements of the displacement elements in order to support the high torques that are present.

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so that where applicable, explanations from other figures can also be used.

Figure 2:
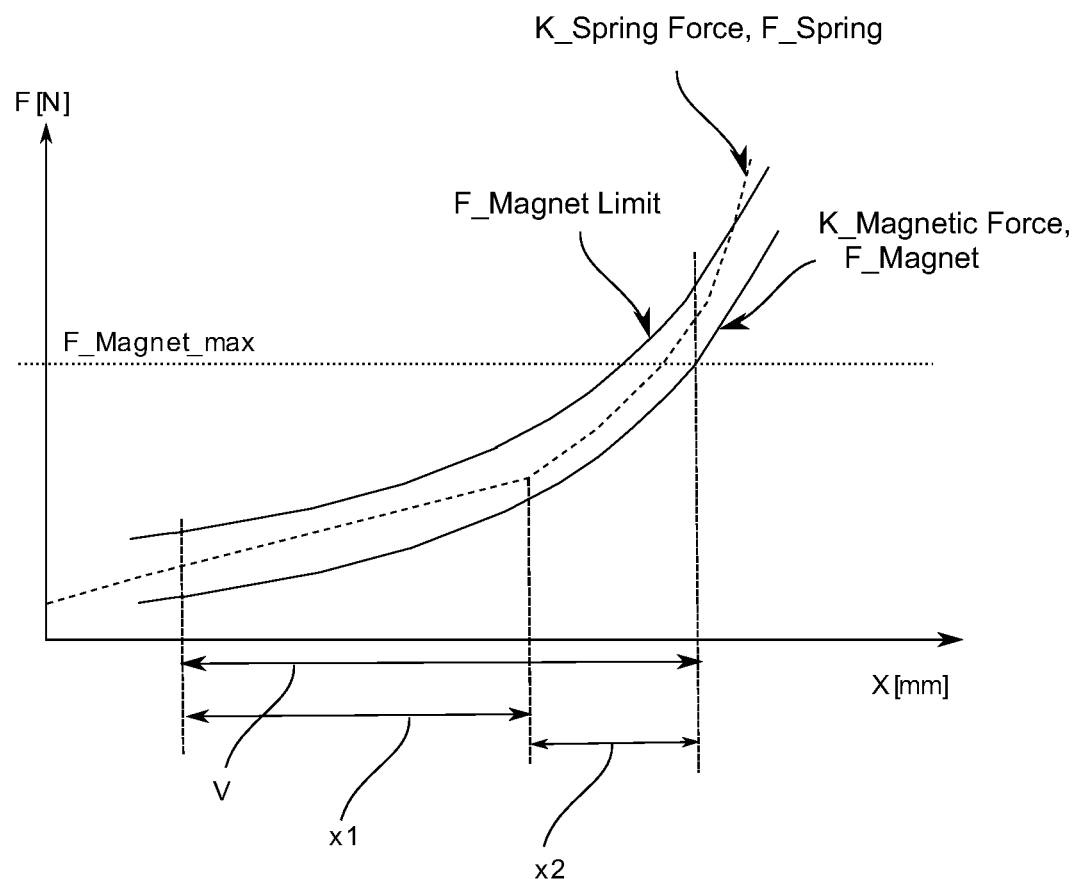
Figure 3:
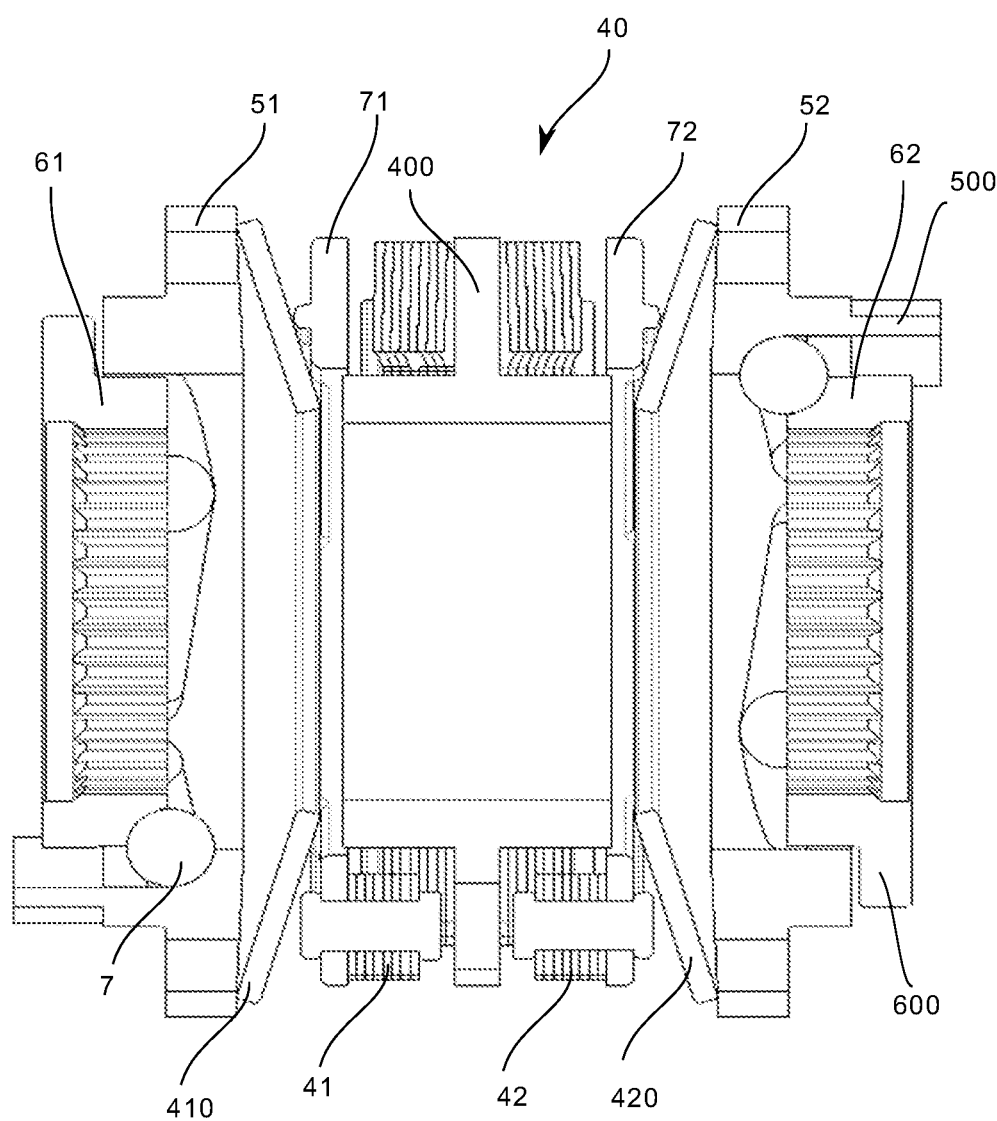
Figure 4:
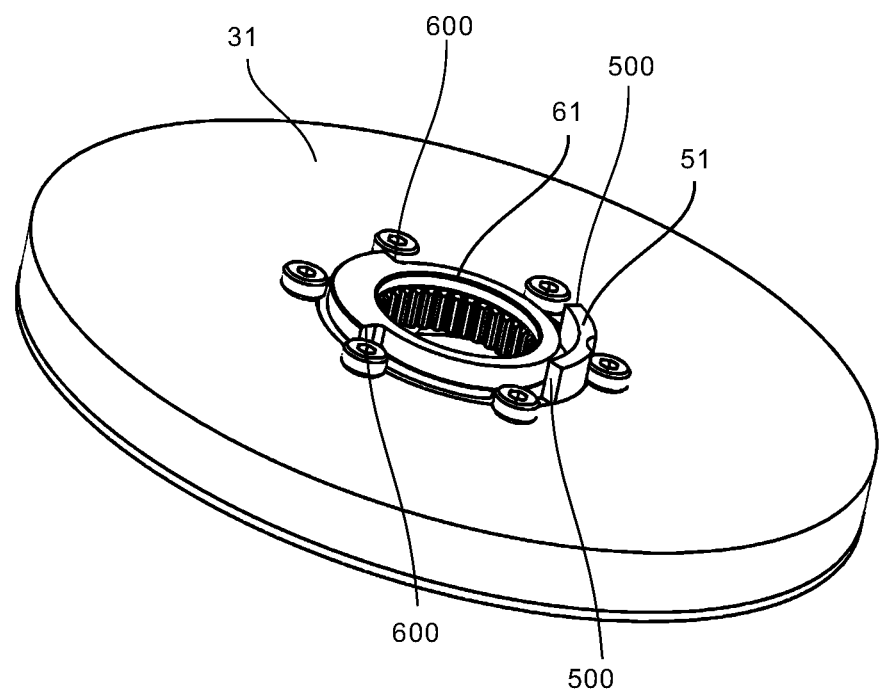
Figure 5:
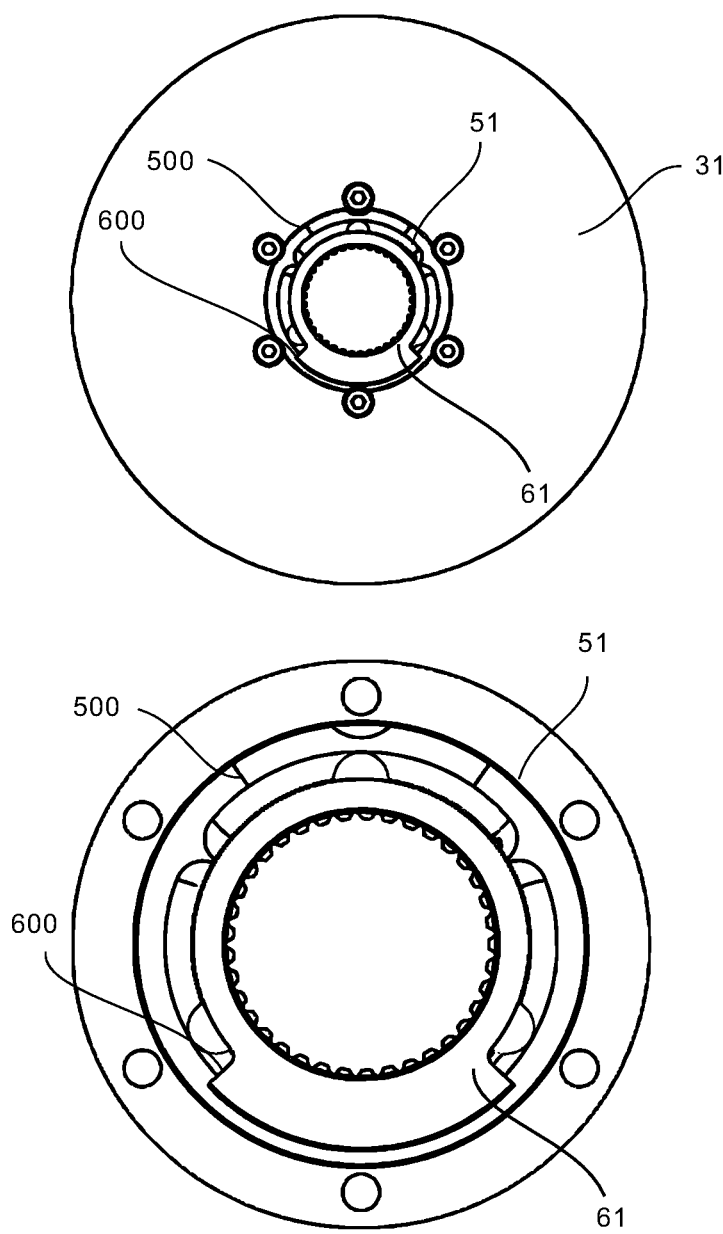
Figure 6:
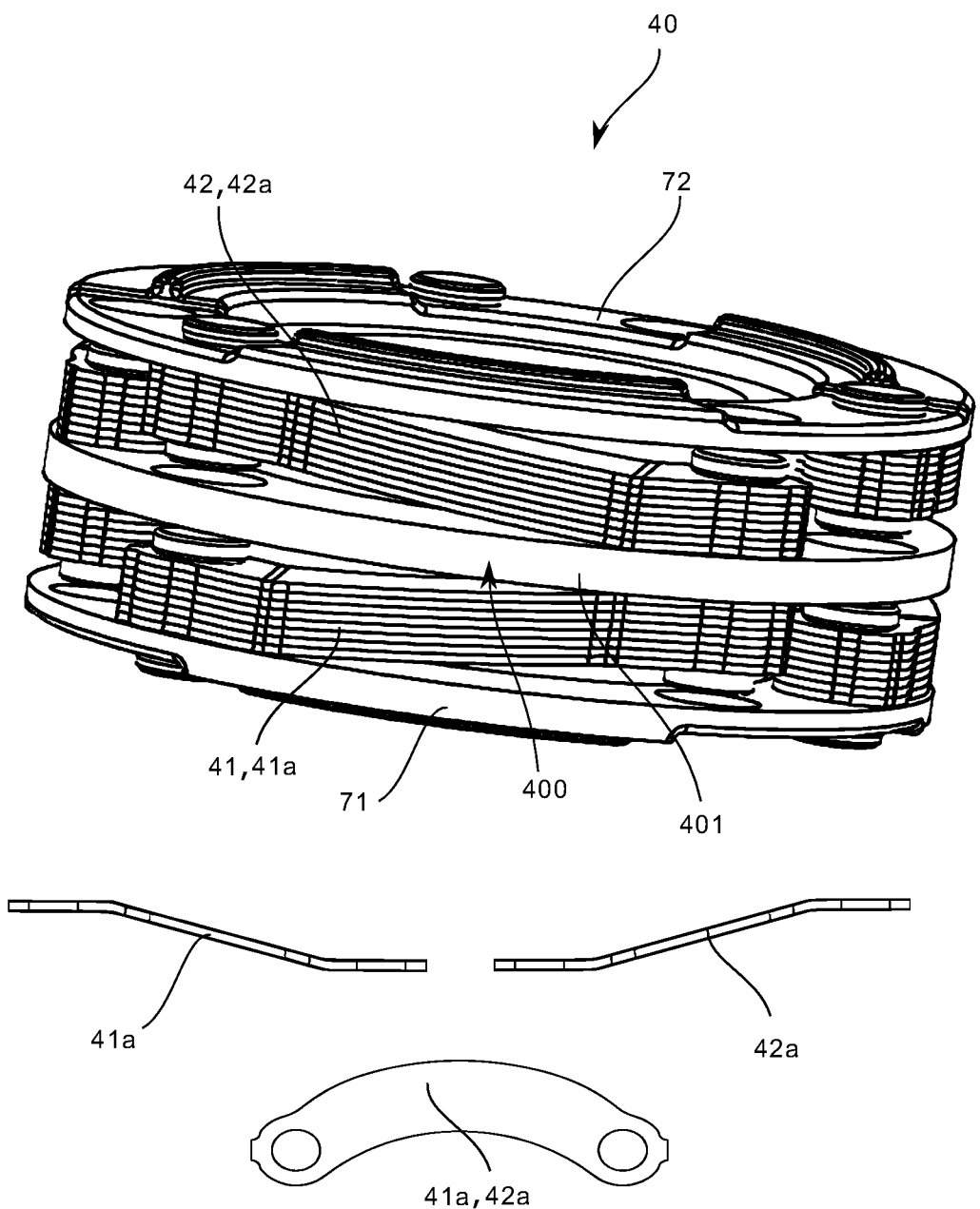
Figure 7:
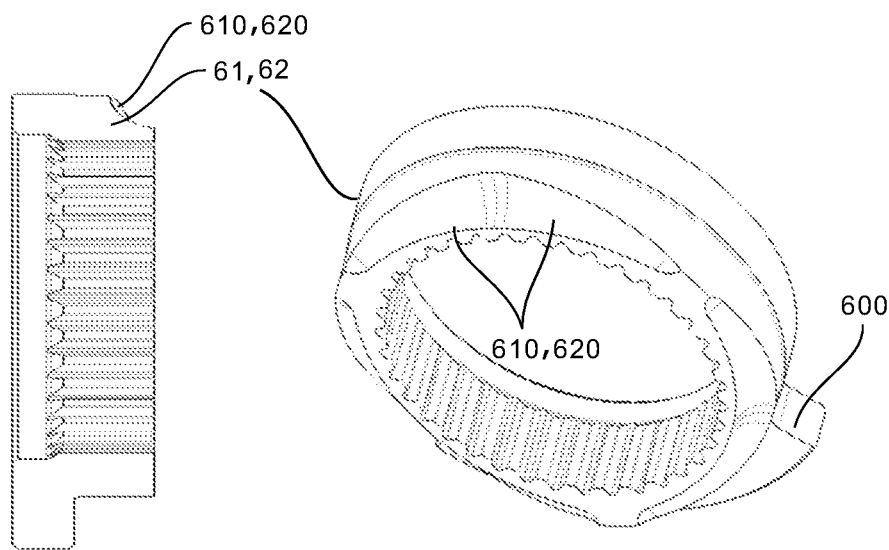
Figure 7:
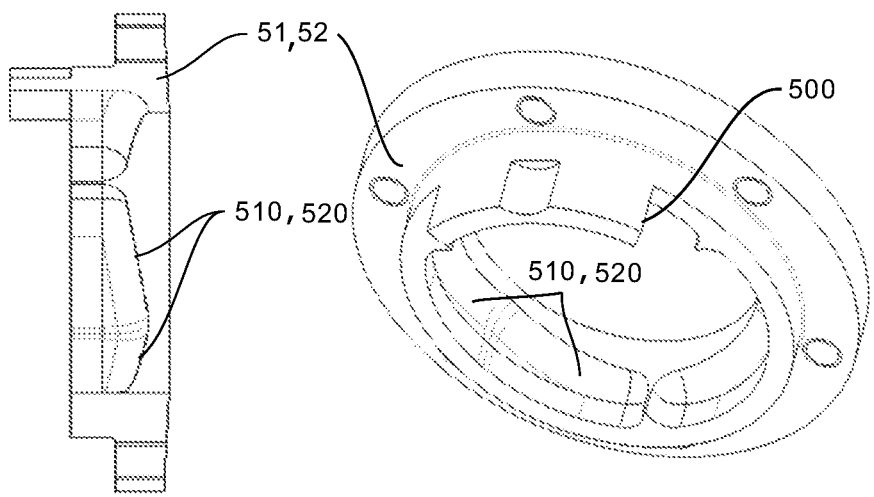

In the figures:

FIG. 1 shows an electric axial flow machine according to the disclosure in an axial section in a schematic representation, FIG. 2 shows a force-displacement diagram with a magnetic force characteristic, which shows the magnetic force curve changing over the displacement path within the air gap, and a spring force characteristic, which shows the spring force curve changing over the displacement path within the air gap and counteracting the magnetic force, FIG. 3 shows the displacement device of the axial flow machine in an enlarged axial section in a schematic representation, FIG. 4 shows a rotor of the axial flow machine according to the disclosure in a perspective view, FIG. 5 shows the displacement device of the axial flow machine in an axial plan view, with the rotor body mounted at the top and without the rotor body at the bottom, FIG. 6 shows a part of the spring device of the displacement device of the axial flow machine in a perspective view, and FIG. 7 shows the first displacement element (below) and the second displacement element (above) of the displacement device, once in an axial section (left) and once in a perspective view (right).

DETAILED DESCRIPTION

FIG. 1 shows an electric axial flow machine 1 according to the disclosure in an axial section in a schematic representation. The axial flow machine 1 shown, constructed in a so-called H-arrangement, comprises an axially centrally arranged stator 2, a first rotor body 31 positioned axially to the left of the stator 2 and arranged on a rotor shaft 3, and a second rotor body positioned axially to the right of the stator 2 and on the rotor shaft 3 arranged rotor body 32. The two rotor bodies 31, 32 are each arranged at an axial distance d from the stator 2, forming a first air gap L1 and a second air gap L2. A displacement device 4 is arranged between the two rotor bodies 31, 32, via which the two rotor bodies 31, 32 are rotationally coupled to one another and via which the two rotor bodies 31, 32 can be reduced as a function of a torque occurring between the rotor shaft 3 and the rotor bodies of the air gap L1, L2 and, for amplifying the magnetic field, can be displaced synchronously and without a rotational offset in relation to one another in the direction of the stator 2.

The displacement device 4 comprises at least one spring device 40 which acts on the first rotor body 31 and on the second rotor body 32 counter to the magnetic attractive force F_Magnet between the respective rotor body 31, 32 and the stator 2.

FIG. 2 shows a force-displacement diagram with a magnetic force characteristic curve K_Magnetic Force, which shows the magnetic force F_Magnet changing over the displacement path within the air gap L1, L2, and a spring force characteristic curve K_Spring Force, which shows the variation of the spring force F_Spring over the displacement path V within the air gap L1, L2, which counteracts the magnetic force F_Magnet.

The spring device 40 is configured in such a way that a spring force characteristic curve K_Magnetic Force is formed, which runs over the entire displacement path V with its spring force F_Spring above the magnetic force characteristic curve K_Magnetic Force.

As shown in FIG. 3, the spring device 40 has a first spring element 41, 42 and a second spring element 410, 420 acting parallel thereto, wherein the first spring element 41, 42 is designed as a leaf spring assembly and the second spring element 410, 420 is designed as a plate spring. FIGS. 2 and 3 also clearly show that the first spring element 41, 42 and the second spring element 410, 420 are mechanically arranged in series and act in parallel in such a way that over a first displacement path section x1 (see FIG. 2) both the first and the second spring element 41, 42; 410, 420 are at least partially but not completely compressed, and that the first spring element 41, 42 remains fully compressed within a second displacement path section x2 subsequent to the first displacement path section x1.

The displacement device 4 shown in detail in an axial section in FIG. 3 comprises a spring device 40 with a centrally arranged spring support 400 seen in the axial extension of the displacement device 4, which supports a first spring element 41; 42 in the form of a leaf spring assembly axially on both sides. The respective leaf spring assembly, as shown in FIG. 6, is divided into three individual leaf spring assemblies distributed around the circumference, which are connected at a free end via a pin or rivet connection to an annular collar 401 pointing radially outwards in the center of the sleeve-like spring support 400. The individual leaf spring assemblies are connected at their other free end via a pin or rivet connection to a spring bearing ring 71, 72 for receiving the second spring element 410, 420 designed as a plate spring. The spring bearing ring has an inner diameter that is larger than the outer diameter of the sleeve of the spring support 400, so that the spring support 400 can be guided with its axial sleeve ends when the spring device 40 is compressed over the sleeve section of the spring support.

As can be seen clearly in FIGS. 3 and 6, the spring device 40 is constructed in such a way that the two spring bearing rings 71, 72, which are arranged axially at a distance from the annular collar 401 and are fixedly connected on both sides to the respective individual leaf spring assemblies, move in the same direction of rotation over the entire displacement path V and without a relative rotational offset to one another. For this purpose, the leaf springs 41a, 42a of the individual leaf spring assemblies have a longitudinal extent in the form of a circular arc segment when viewed from above (see FIG. 6, below). The leaf springs 41a, 42a are double-bent, as seen in a side view, so that one axial end of a leaf spring 41a, 42a has a different height than the other axial end. The axial ends of a leaf spring 41a, 42a are consequently connected to one another via a ramp-shaped connecting section. The leaf springs 41a, 42a of the leaf spring assemblies on the two axial sides of the annular collar 401 are cranked out of the plane in different directions (see FIG. 6, below in the different side views of the differently bent leaf springs 41a, 42a). The individual leaf spring assemblies are arranged on the central annular collar 401 and on the spring bearing rings 70 in such a way that a kind of scissor mechanism results, which is why the axially outer spring bearing rings do not twist or brace against one another when the spring device moves together or moves apart in the axial direction.

A first displacement element 51, 52, designed as a support for the first and second rotor bodies 31; 32, respectively, adjoins the second spring element 410, 420 axially outwardly on both sides, wherein the first displacement element 51, 52 is arranged or can be arranged axially displaceably and rotatably to a limited extent on the rotor shaft 3, which is not arranged axially displaceably (not shown in FIG. 3). A second displacement element 61; 62, which is or can be connected to the rotor shaft 3 in a rotationally fixed and displaceable manner and cooperates with the respective first displacement element 51; 52, adjoins the respective first displacement element 51, 52 axially on both sides towards the outside. In this case, each first displacement element 51, 52 is supported in the axial direction inwards against the first and second spring elements 41, 42; 410, 420 in the direction of the central ring collar 401. Between the first displacement element 51, 52 and the second displacement element 61, 62, three rolling elements 7 designed as balls are arranged, wherein the first displacement element 51, 52 has a total of three first ramp elements 510, 520 on its side facing the second displacement element 61, 62 and the second displacement element 61, 62 has a total of three second ramp elements 610, 620 corresponding to the first ramp elements 510, 520 on its side facing the first displacement element 51, 52. The first ramp elements 510, 520 and the second ramp elements 610, 620 are designed in such a way that if the first displacement element 51, 52 rotates relative to the second displacement element 61, 62 or vice versa, the rotor bodies 31, 32 are displaced axially inwards relative to the rotor shaft 3, so that an existing air gap L1, L2 is reduced accordingly. In the preferred illustrated embodiment, the first and second ramp elements 510, 520; 610, 620 are each designed in pairs, so that rotation and an associated axial displacement of the displacement elements 51, 52; 61, 62 against one another or the rotor body 31, 32 is guaranteed with different directions of rotation of the electric machine 1.

The displacement device 4 shown is arranged in a floating manner on the rotor shaft 3, wherein the two rotor bodies 31, 32 support one another via the displacement device 4.

One of the two second displacement elements 61, 62 could also be designed as an integral part of the rotor shaft 3 instead of as a separate component. In the example shown in FIG. 3, this would be the second displacement element 62 shown on the right, which could be designed as an integral part of the rotor shaft 3. The rotor shaft 3 shown here is made in two parts and can be mounted on the left side via a separate radially widened bearing receiving extension to form a uniform rotor shaft 3 with bearing receiving extensions formed axially on both sides. As part of the assembly of the rotor shaft 3, a first rotor shaft part with an integrated bearing receiving extension (here formed on the right) could be provided and then the displacement device 4 with its remaining individual parts mounted on the rotor shaft 3 and then completed using the second rotor shaft part designed as a bearing receiving extension.

FIGS. 3, 4, 5 and 7 show that stop means 500, 600 are provided between the first displacement element 51, 52 and the second displacement element 61, 62, which are designed in such a way that, in an operating state with a torque present between the rotor shaft 3 and the rotor body 31, 32 which is above a predetermined maximum displacement torque, the torque which occurs is transmitted via the stop means 500, 600 instead of via the corresponding first and second ramp means 510, 520; 610, 620 of first and second displacement elements 51, 52; 61, 62. The stop means 500, 600 are designed as circular ring segments pointing radially outwards. In this case, the stops can have buffer means (not shown) in order to ensure a gentler stop when moving into the operating position of the maximum torque. The buffer means can be formed, for example, by arranged elastomer elements or spring elements or by finite rigidities in the geometry of the stop means 500, 600.

The first ramp element 510, 520 and the second ramp element 610, 620 are designed such that in a state in which the first displacement element 51, 52 and the second displacement element 61, 62 are not rotated in relation to one another, as shown in FIG. 1, the rotor body 31, 32 and the stator 2 are arranged at a predetermined maximum axial distance from one another.

The disclosure is not limited to the embodiments shown in the figures. The above description should therefore be regarded as explanatory rather than restrictive. The following claims are to be understood as meaning that a said feature is present in at least one embodiment according to the disclosure. This does not preclude the presence of other features. Where the claims and the foregoing description define 'first' and 'second' features, this designation serves to distinguish two features of the same kind without establishing an order of precedence.

LIST OF REFERENCE NUMERALS

1 Axial flow machine
2 Stator
3 Rotor shaft
4 Displacement device
7 Rolling element
31 First rotor body
32 Second rotor body
40 Spring device
41, 42 First spring element
41a, 42a Leaf spring
410, 420 Second spring element
51, 52 First displacement element
61, 62 Second displacement element
500 Stop means (of the first displacement element)
600 Stop means (of the second displacement element)
70 Spring bearing ring
d Axial distance
L1, L2 Air gap
V Displacement path
X1 First displacement path section
X2 Second displacement path section

The invention claimed is:

1. An electric axial flow machine, comprising
a stator;
a first rotor body arranged on a rotor shaft;
a second rotor body arranged on the rotor shaft;
a displacement device arranged between the first and second rotor bodies and coupled to the first and second rotor bodies;
one of the first or second rotor bodies is arranged on one axial side of the stator at an axial distance, forming a first air gap;
an other of the first or second rotor bodies is arranged on an other axial side of the stator at an axial distance, forming a second air gap;
the axial distance between the respective first and second rotor bodies, arranged axially on both said axial sides, and the stator are variable over a displacement path by the displacement device depending on a torque occurring between the rotor shaft and the rotor bodies;
a magnetic attractive force between the respective first or second rotor body and the stator over the displacement path maps a magnetic force characteristic;
the displacement device comprises at least one spring device which acts on the first rotor body and the second rotor body against the magnetic attractive force between the rotor body and the stator; and
the spring device is configured such that a spring force characteristic is formed which runs above a magnetic force characteristic over an entirety of the entire displacement path;
wherein the spring device comprises a first spring element and a second spring element, the first spring element comprises a leaf spring assembly with a plurality of leaf springs, and the second spring element comprises a plate spring.

2. The axial flow machine according to claim 1, wherein the first spring element and the second spring element are mechanically arranged in series and to act in parallel such that over a first displacement path section both the first and the second spring element are at least partially but not completely compressed, and the first spring element remains fully compressed within a second displacement path section subsequent to the first displacement path section.

3. The axial flow machine according to claim 1, wherein the displacement device comprises:
 a centrally arranged spring support, viewed in an axial extent of the displacement device, which supports at least one first spring element on each axial side,
 a respective second spring element axially on each said side, the second spring element acting parallel to the first spring element,
 a respective first displacement element axially on each said side, the respective first displacement element forms a support for the respective first and the second rotor bodies, the first displacement element is arranged in an axially displaceable and limitedly rotatable manner on the rotor shaft, which is not arranged in an axially displaceable manner, and
 a respective second displacement element axially on each said side, the respective second displacement element is connected to the rotor shaft in a rotationally fixed and non-displaceable manner and cooperates with the respective first displacement element, each said first displacement element is supported in the axial direction against the first and second spring elements, at least one rolling element is arranged between the first displacement element and the second displacement element, and the first displacement element has a first ramp element on a side thereof facing the second displacement element and the second displacement element has a second ramp element on a side thereof facing the first displacement element, and the first ramp element and the second ramp element are configured such that upon the first displacement element rotating relative to the second displacement element or vice versa, the rotor body is axially displaced relative to the rotor shaft.

4. The axial flow machine according to claim 3, wherein at least one of a) the first spring element is configured to map a linear spring force characteristic, or b) the second spring element is configured to map a progressive spring force characteristic.

5. The axial flow machine according to claim 3, wherein the displacement device is arranged floating on the rotor shaft and the two rotor bodies support one another via the displacement device.

6. The axial flow machine according to claim 3, wherein the spring device is maps a spring force characteristic which lies below a function F_Magnet_limt=F_Magnet+F_Magnet_max*0.3 over the entire displacement path.

7. The axial flow machine according to claim 3, further comprising stop means between the first displacement element and the second displacement element said stop means being configured such that, in an operating state with a torque present between the rotor shaft and the rotor body which is above a predetermined maximum displacement torque, the torque which occurs is transmitted via the stop instead of via corresponding first and second ramp elements of the first and second displacement elements.

8. The axial flow machine according to claim 1, wherein the first rotor body and the second rotor body are rotationally coupled to one another such that there is no relative rotation between the first rotor body and the second rotor body during operation of the axial flow machine.

9. An electric axial flow machine, comprising
 a stator;
 a first rotor body arranged on a rotor shaft;
 a second rotor body arranged on the rotor shaft;
 a displacement device arranged between the first and second rotor bodies and coupled to the first and second rotor bodies;
 one of the first or second rotor bodies is arranged on one axial side of the stator at an axial distance, forming a first air gap;
 an other of the first or second rotor bodies is arranged on an other axial side of the stator at an axial distance, forming a second air gap;
 the axial distance between the respective first and second rotor bodies, arranged axially on both said axial sides, and the stator are variable over a displacement path by the displacement device depending on a torque occurring between the rotor shaft and the rotor bodies;
 a magnetic attractive force between the respective first or second rotor body and the stator over the displacement path maps a magnetic force characteristic;
 the displacement device comprises at least one spring device which acts on the first rotor body and the second rotor body against the magnetic attractive force between the rotor body and the stator; and
 the spring device is configured such that a spring force characteristic is formed which runs above a magnetic force characteristic over an entirety of the entire displacement path;
 wherein the displacement device comprises:
  a centrally arranged spring support, viewed in an axial extent of the displacement device, which supports at least one first spring element on each axial side,
  a respective second spring element axially on each said side, the second spring element acting parallel to the first spring element,
  a respective first displacement element axially on each said side, the respective first displacement element forms a support for the respective first and the second rotor bodies, the first displacement element is arranged in an axially displaceable and limitedly rotatable manner on the rotor shaft, which is not arranged in an axially displaceable manner, and
  a respective second displacement element axially on each said side, the respective second displacement element is connected to the rotor shaft in a rotationally fixed and non-displaceable manner and cooperates with the respective first displacement element, each said first displacement element is supported in the axial direction against the first and second spring elements, at least one rolling element is arranged between the first displacement element and the second displacement element, and the first displacement element has a first ramp element on a side thereof facing the second displacement element and the second displacement element has a second ramp element on a side thereof facing the first displacement element, and the first ramp element and the second ramp element are configured such that upon the first displacement element rotating relative to the second displacement element or vice versa, the rotor body is axially displaced relative to the rotor shaft; and
  a spring bearing ring provided in each case between the first spring element and the second spring element.

10. The axial flow machine according to claim 9, wherein the spring support comprises a sleeve, which in an axial center thereof has a radially outwardly projecting central annular collar, the annular collar supports a plurality of individual leaf spring assemblies distributed circumferentially on both sides and acting in the axial direction, each of the individual leaf spring assemblies is fixedly attached to the annular collar with a free end and each of the individual leaf spring assemblies is fixedly attached with an other free end to the spring bearing ring spaced axially from the annular collar via the individual leaf spring assemblies.

11. The axial flow machine according to claim 10, wherein each said spring device is constructed such that the two spring bearing rings, which are arranged axially at a distance from the annular collar and are fixedly connected on both sides to the respective individual leaf spring assemblies, move in a same direction of rotation over an entirety of the displacement path and without a relative rotational offset with respect to one another.

12. The axial flow machine according to claim 7, wherein the first ramp element and the second ramp element are configured such that in a state in which the first displacement element and the second displacement element are not rotated in relation to one another, the rotor bodies and the stator are arranged at a predetermined maximum axial distance from one another.

13. The axial flow machine according to claim 12, wherein the first displacement element has at least three of the first ramp elements and the second displacement element has at least three of the second ramp elements which are arranged and formed to correspond to the first ramp elements.

14. The axial flow machine according to claim 8, wherein a frictional connection between the two rotor bodies is realized via the displacement device arranged between the first and second rotor bodies.

* * * * *